United States Patent
Siegel et al.

(10) Patent No.: US 11,746,847 B2
(45) Date of Patent: Sep. 5, 2023

(54) CLUTCH SYSTEM AND VEHICLE TRANSMISSION SYSTEM INCLUDING THE SAME

(71) Applicant: BorgWarner Inc., Auburn Hills, MI (US)

(72) Inventors: Benjamin A. Siegel, Chicago, IL (US); Steven J. Kowal, Naperville, IL (US); Richard W. Pridgen, Jr., Arlington Heights, IL (US); David T. Vierk, Mokena, IL (US)

(73) Assignee: BorgWarner Inc., Auburn Hills, MI (US)

( * ) Notice: Subject to any disclaimer, the term of this patent is extended or adjusted under 35 U.S.C. 154(b) by 25 days.

(21) Appl. No.: 17/139,474

(22) Filed: Dec. 31, 2020

(65) Prior Publication Data
US 2021/0207671 A1    Jul. 8, 2021

Related U.S. Application Data

(60) Provisional application No. 62/957,994, filed on Jan. 7, 2020.

(51) Int. Cl.
*F16D 69/02*    (2006.01)
*F16D 13/52*    (2006.01)

(52) U.S. Cl.
CPC ............. *F16D 69/02* (2013.01); *F16D 13/52* (2013.01); *F16D 69/027* (2013.01)

(58) Field of Classification Search
CPC .... F16D 13/52; F16D 13/24–36; F16D 13/64; F16D 13/648
See application file for complete search history.

(56) References Cited

U.S. PATENT DOCUMENTS

| | | | |
|---|---|---|---|
| 4,552,259 A | 11/1985 | Albertson | |
| 5,452,784 A * | 9/1995 | Miyoshi | F16D 13/64 192/70.14 |

(Continued)

FOREIGN PATENT DOCUMENTS

| | | |
|---|---|---|
| CN | 109340275 A | 2/2019 |
| DE | 102018103519 A1 * | 8/2019 |

(Continued)

OTHER PUBLICATIONS

Machine translation of DE102018103519, retrieved from espacenet.com (Year: 2023).*

(Continued)

*Primary Examiner* — Stacey A Fluhart
(74) *Attorney, Agent, or Firm* — Howard & Howard Attorneys PLLC

(57) ABSTRACT

A clutch system includes a first clutch member and a second clutch member for transmitting torque from a vehicle power generator. The first clutch member includes a first a first clutch element having a first surface and a first friction material disposed on said first surface. The second clutch member is configured to engage the first clutch plate and includes a second clutch element having a second surface and a second friction material disposed on the second surface. The first friction material is configured to be engaged with the second friction material during operation of the vehicle power generator.

27 Claims, 9 Drawing Sheets

(56) References Cited

U.S. PATENT DOCUMENTS

| | | | |
|---|---|---|---|
| 5,727,665 A * | 3/1998 | Gonia | F16D 13/71 |
| | | | 192/70.14 |
| 6,182,804 B1 | 2/2001 | Lam | |
| 6,875,711 B2 | 4/2005 | Chen et al. | |
| 7,059,459 B2 * | 6/2006 | Miyoshi | F16D 13/648 |
| | | | 192/70.12 |
| 8,463,482 B2 | 6/2013 | Rains et al. | |
| 10,436,272 B2 | 10/2019 | Dong et al. | |
| 11,333,204 B2 * | 5/2022 | Uehara | F16D 13/72 |
| 2007/0151822 A1 | 7/2007 | Toya et al. | |
| 2007/0295574 A1 * | 12/2007 | Toya | F16D 13/648 |
| | | | 192/70.14 |
| 2009/0000899 A1 * | 1/2009 | Paterra | F16D 25/0638 |
| | | | 192/70.14 |
| 2009/0321210 A1 * | 12/2009 | Tung | F16D 13/648 |
| | | | 192/70.14 |
| 2011/0272238 A1 * | 11/2011 | Basu | B32B 25/16 |
| | | | 428/419 |
| 2013/0213758 A1 * | 8/2013 | Langenkaemper | F16D 13/64 |
| | | | 192/70.14 |
| 2017/0261057 A1 | 9/2017 | Farahati et al. | |
| 2018/0023632 A1 | 1/2018 | Nishiyama | |
| 2019/0003544 A1 * | 1/2019 | Dong | F16D 69/0408 |
| 2019/0048954 A1 * | 2/2019 | Bernhardt | F16D 13/74 |
| 2019/0195293 A1 * | 6/2019 | Foege | F16D 13/648 |
| 2019/0275760 A1 | 9/2019 | Farahati et al. | |
| 2019/0277345 A1 | 9/2019 | Farahati et al. | |
| 2019/0277359 A1 | 9/2019 | Farahati et al. | |
| 2019/0301538 A1 * | 10/2019 | Francis | F16D 13/64 |

FOREIGN PATENT DOCUMENTS

| | | | |
|---|---|---|---|
| DE | 102018109152 A1 * | 10/2019 | |
| EP | 3473883 A1 | 4/2019 | |
| WO | WO-2005073584 A1 * | 8/2005 | F16D 13/26 |

OTHER PUBLICATIONS

English language abstract and machine-assisted English translation for CN 109340275 extracted from espacenet.com database on Feb. 1, 2021, 7 pages.

* cited by examiner

CLUTCH SYSTEM AND VEHICLE TRANSMISSION SYSTEM INCLUDING THE SAME

BACKGROUND OF THE INVENTION

1. Field of the Invention

The present invention generally relates to a clutch system and, more specifically, to a clutch system for use in a vehicle transmission system.

2. Description of the Related Art

Several components of a vehicle powertrain may employ a system to facilitate the transfer of power from the vehicle's power generator (e.g. an internal combustion engine, electric motor, fuel cell, etc.) to drive wheels of the vehicle. A vehicle transmission is located downstream from the power generator, and enables vehicle launch, gear shifting, and other torque transfer events. The vehicle transmission may be coupled to a clutch system. Some form of a clutch system may be found throughout many different types of vehicle transmissions currently available for vehicle operation. A clutch system may be utilized in a torque converter for an automatic transmission, in a multi-plate clutch pack for an automatic transmission or a semi-automatic dual-clutch transmission (DCT), and in a start clutch that may be incorporated into an automatic transmission equipped with as many as seven to ten gears as a substitute for the torque converter, to name but a few examples. Similar clutch systems can be found elsewhere in the vehicle powertrain besides the vehicle transmission.

As best illustrated in FIG. 1, a conventional clutch system 100 typically includes a plurality of clutch plates 102 rotatably coupled to a shaft 26, with the plurality clutch plates 102 being used to interlock two or more opposed, rotating surfaces by imposing selective interfacial frictional engagement between those surfaces. Each clutch plate 102 includes a core plate 104 comprising steel and defining a bore for receiving the shaft 26 such that each clutch plate 102 is rotatably coupled to the shaft 26. Each clutch plate 102 additionally includes a friction material 108 disposed on each side the core plate 104, which effectuates the intended frictional engagement between the plurality of clutch plates 102.

Conventional clutch assemblies 100, as illustrated in FIG. 1, also include at least one separator plate 110, typically comprised of steel, placed between two consecutive conventional clutch plates 102. During operation, the plurality of clutch plates 102 move between an engaged position where the plurality clutch plates 102 are engaged with the separator plate 110, and a disengaged position where the plurality clutch plates 102 are disengaged from the separator plate 110. The separator plates 110 act as heat sinks to absorb energy produced by the frictional engagement of the two opposed, rotating surfaces. Having separator plates 110 within the clutch system 100 requires a large axial space of the clutch system 100 and also heat sink is not always utilized as the clutch must be designed for a high maximum heat. Other clutch assemblies include a core plate comprising steel and having friction material disposed on only one side of the core plate. However, in this arrangement, the friction material of a first clutch plate engages the core plate of a second clutch plate which results in potential heat gradients and additional energy problems.

As such, there remains a need to provide an improved clutch system.

SUMMARY OF THE INVENTION AND ADVANTAGES

A clutch system is disclosed which is operably coupled to a vehicle power generator. The clutch system includes a first clutch member for transmitting torque from the vehicle power generator. The first clutch member includes a first clutch element having a first surface, and a first friction material disposed on said first surface. The clutch system also includes a second clutch member for transmitting torque from the vehicle power generator and is configured to engage said first clutch member. The second clutch member includes a second clutch element having a second surface, and a second friction material disposed on said second surface. The first friction material and said second friction material may be the same or different. The first friction material is configured to be engaged with said second friction material during operation of the vehicle power generator. A vehicle transmission system including a vehicle transmission and the clutch system is also disclosed.

Accordingly, having the first friction material configured to be engaged with the second friction material during operation of the vehicle engine leads to a reduction in axial length of the clutch system and also leads to improved performance of the clutch system and more specifically to an increased breakaway coefficient across various loads.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
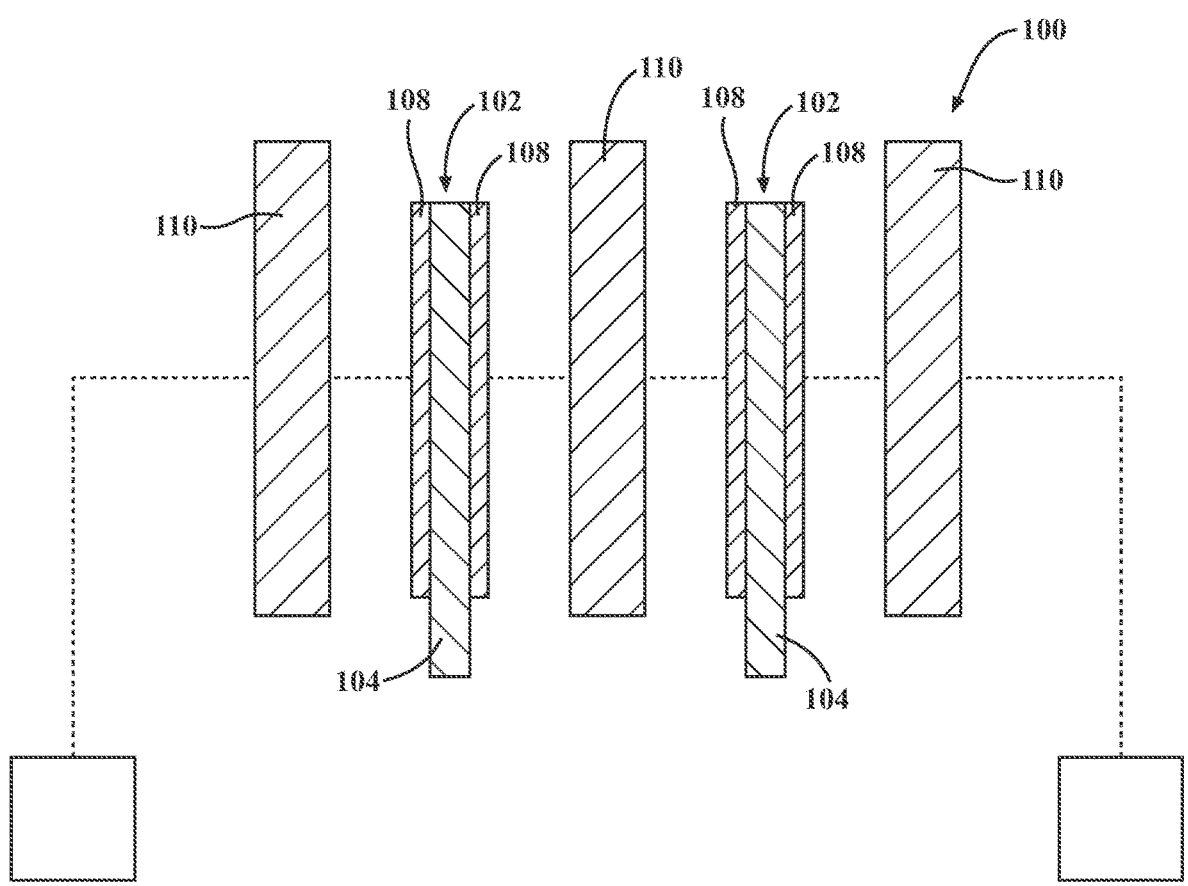
FIG. 1 is a simplified cross-sectional view of a prior art clutch system including a plurality of clutch plates and separator plates.

With reference to the Figures, wherein like numerals indicate like parts throughout the several views, a vehicle transmission system 10 is generally shown in FIG. 2. The vehicle transmission system 10 is operably coupled to a vehicle power generator 12. In one example, the vehicle power generator 12 is a vehicle engine such as an internal combustion engine, however, it is contemplated the vehicle power generator 12 may be any type of power generator including but not limited to an electric motor, a battery, or a fuel cell. The vehicle transmission system 10 includes a vehicle transmission 14 coupled to the vehicle power generator 12. The vehicle transmission 14 may be any type of transmission including but not limited to automatic, manual, automated-manual, dual-clutch, continuously variable or the like. Moreover, the vehicle transmission system 10 also includes a clutch system 20 operably coupled to the vehicle transmission 14. The clutch system 20 may be a wet clutch system, a semi-wet clutch system, or a dry clutch system. It is also contemplated that the clutch system may be a plate clutch system (see FIGS. 2-6), a cone clutch system (see FIGS. 9 and 10), or other clutch systems. The clutch system 20 may also include a shaft 26 having a length and an axis A extending along the length.

In one example, the clutch system 20 includes a first clutch member 21 and a second clutch member 23 for transmitting torque from the vehicle power generator 12. It is contemplated that the first clutch member 21 and the second clutch member 23 may be clutch plates such that first clutch member 21 is a first clutch plate 22 and the second clutch member 23 is a second clutch plate 24. However, it is also contemplated that the first clutch member 21 and the second clutch member 23 may be other clutch members including, but not limited to, a first cone 25 and a second cone 27, respectively. The first clutch member 21 also includes a first clutch element 29 having a first surface 31 and the second clutch member 23 includes a second clutch element 33 having a second surface 35.

Figure 2A:
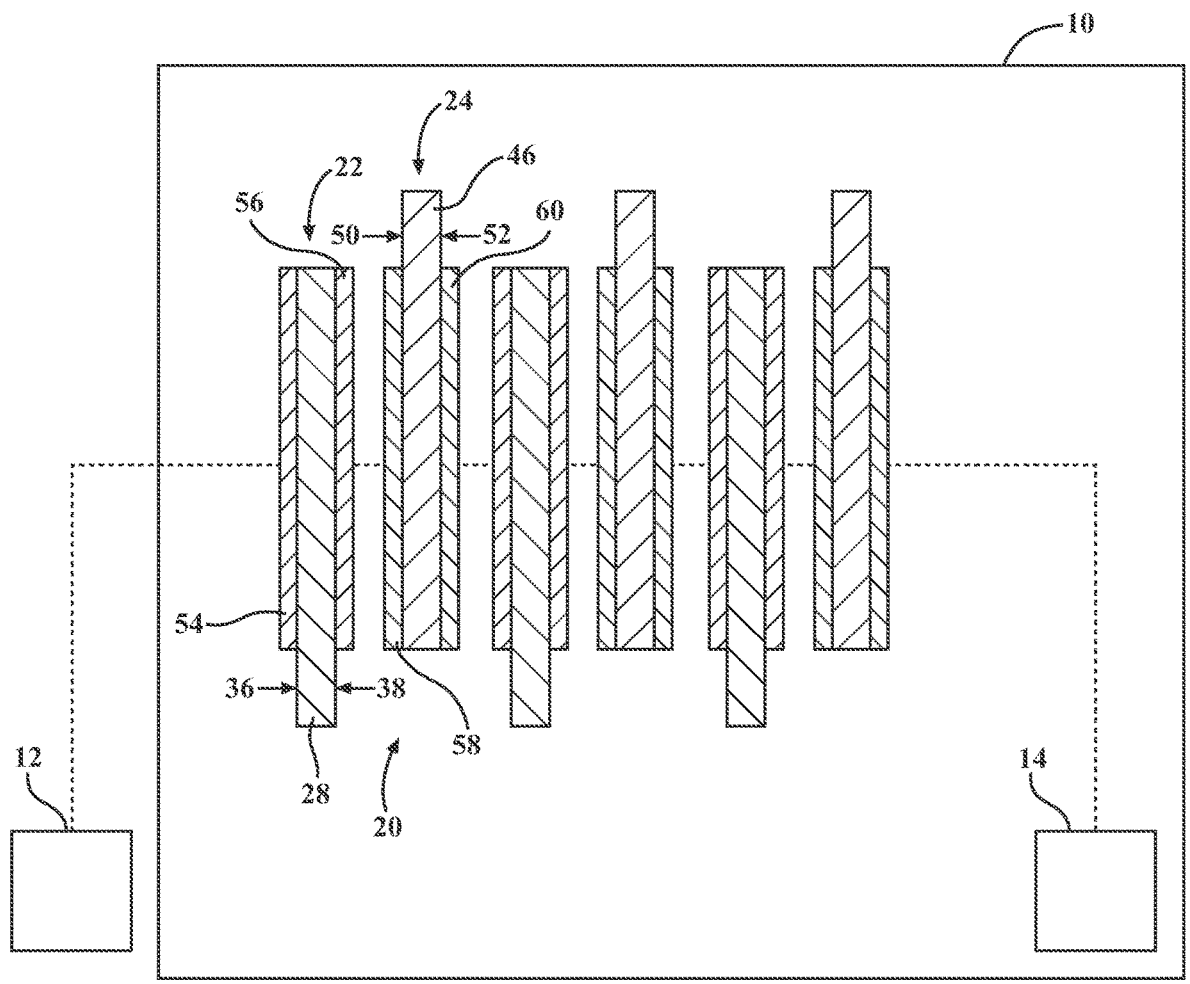
FIG. 2A is a simplified cross-sectional view of a vehicle transmission system according to the present invention including a plurality of clutch plates having a single-layer friction material disposed thereon in a disengaged position.
Figure 2B:
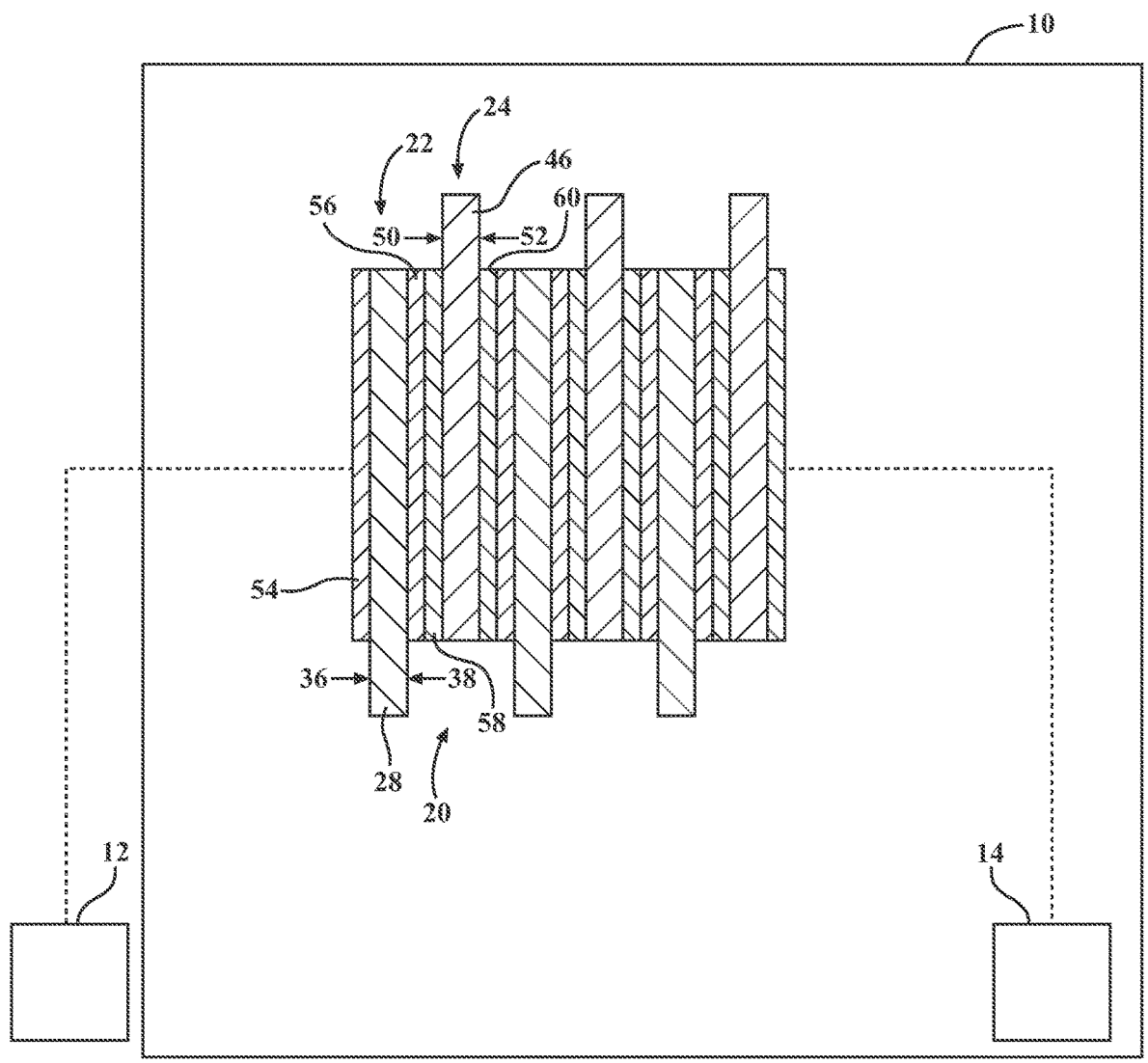
FIG. 2B is a simplified cross-sectional view of a vehicle transmission system according to the present invention including a plurality of clutch plates having a single-layer friction material disposed thereon in an engaged position.
Figure 3:
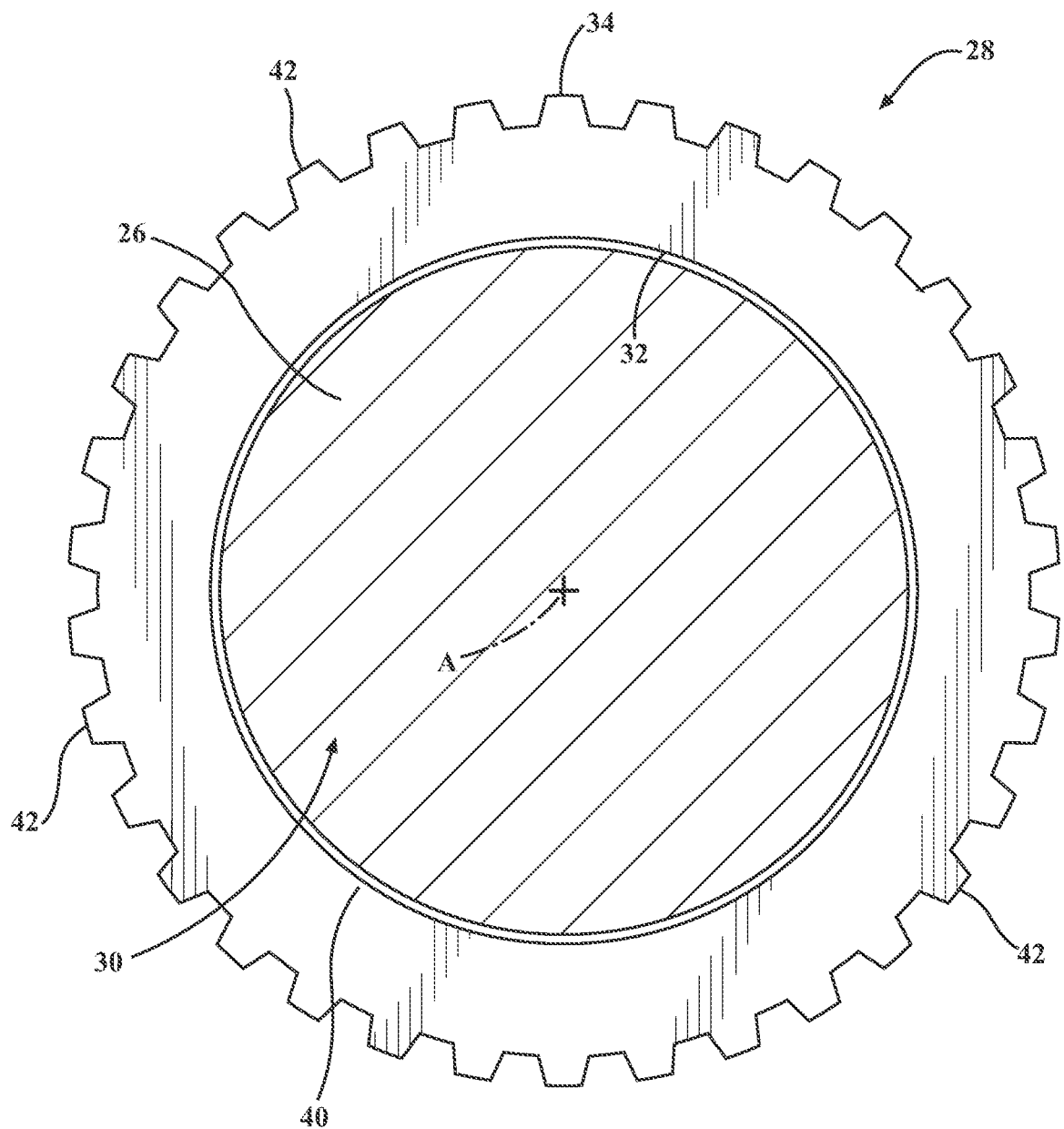
FIG. 3 is a top view of a core plate of the clutch plate according to the embodiment illustrated in FIG. 2.

With reference to FIGS. 2A-3, the first clutch element 29 is a first core plate 28 and the second clutch element 33 is a second core plate 46, however, the first clutch element 29 and the second clutch element 33 may be other clutch elements as known by one of ordinary skill in the art. The first core plate 28 defines a bore 30 extending along the axis A. The bore 30 receives the shaft 26 such that the first core plate 28 is rotatably coupled to the shaft 26. The shaft 26 is also commonly referred to as a hub. The first core plate 28 includes an interior core surface 32 defining the bore 30, and an exterior core surface 34 radially spaced from the interior core surface 32 with respect to the axis A such that the exterior core surface 34 surrounds the interior core surface 32 about the axis A. The first core plate 28 also includes a first side 36 extending between the interior core surface 32 and the exterior core surface 34 and facing a first direction along the axis A. The first core plate 28 further includes a second side 38 extending between the interior core surface 32 and the exterior core surface 34 and facing a second direction opposite the first direction along the axis A. Referring still to FIGS. 2A-3, the first core plate 28 is solid between the interior core surface 32 and the exterior core surface 34 about an entire circumference of the core plate 28 between the interior core surface 32 and the exterior core surface 34, i.e. the core plate 28 is not hollow.

Referring now to FIG. 3, the first core plate 28 is an unbent body and comprises a spline portion 40. In the example illustrated in FIG. 3, the spline portion 40 includes the exterior core surface 34, and the exterior core surface 34 includes a plurality of teeth 42 configured to engage a toothed portion of another component. However, it is also contemplated that the spline portion 40 may alternatively include the interior core surface 32 of the core plate 28 such that the plurality of teeth 42 are arranged on the interior core surface 32.

In the example illustrated in FIGS. 2A and 2B, the clutch system 20 includes the second clutch plate 24. The second clutch plate 24 may be the same as or different than the first clutch plate 22. In one example, the second clutch plate 24 includes a second core plate 46 which is similar to the first core plate 28 in that the second core plate 46 also defines a bore to receive the shaft 26 such that the second core plate 46 is also coupled to the shaft 26. Moreover, the second core plate 46 also includes a first side 50 and a second side 52, similar to the first clutch side 36 and the second clutch side 38 of the first core plate 28 as described above. The second core plate 46 may be the same or different than the first core plate 28 in terms of shape, size, material of construction, etc.

The first core plate 28 and the second core plate 46 may be comprised of any suitable material for use in the clutch system 20. At least one of the first core plate 28 and the second core plate 46 may be comprised of a metallic material. Such metallic materials that may be used include, but are not limited to, stainless steel, mild carbon steel, aluminum, and may contain surface treatments, such as phosphate coating, nickel coating, anodizing, and the like. In one example, at least one of the first core plate 28 and the second core plate 46 is comprised of 1035 carbon steel. As another example, at least one of the first core plate 28 and the second core plate 46 may be comprised of a polymeric material. Such polymeric materials that may be used include thermoset materials and thermoplastic materials. Such thermoset materials that may be used include polyester, vinyl ester, epoxy, phenolic, urethane, polyamide, polyimide, and the like. Such thermoplastic materials that may be used include polyethylene terephthalate (PET), polypropylene, polycarbonate, polybutylene terephthalate (PBT), vinyl, polyethylene, polyvinyl chloride (PVC), and the like. When the polymeric material is used, the polymeric material may be used as a homogeneous polymeric material or may be used with reinforcement in the polymeric material, such as metal, fiberglass, carbon fiber, and the like.

Figure 4:
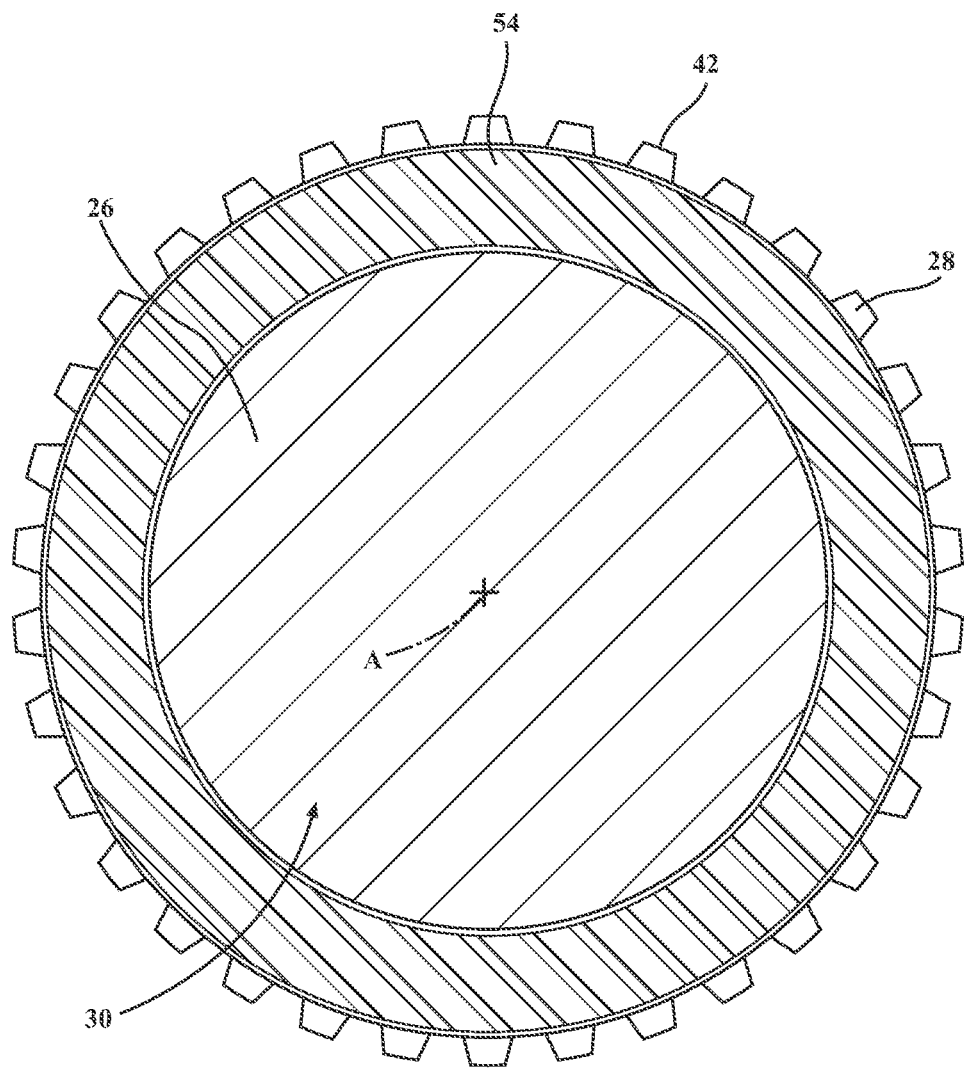
FIG. 4 is a top view of the clutch plate according to the embodiment illustrated in FIG. 2.

With particular reference to FIGS. 2A, 2B, and 4, the first clutch plate 22 includes a friction material disposed on at least one of the first and second sides 36, 38 of the first core plate 28. The friction material is adhered to the first core plate 28 to form the first clutch plate 22. The friction material may be adhered to the first core plate 28 by, for example, a bonding adhesive. Typically, the first clutch plate 22 includes the friction material on both the first and second sides 36, 38. However, it is to be appreciated that the first clutch plate 22 may have the friction material on only one of the first side 36 or the second side 38. In the example illustrated in FIGS. 2A and 2B, a first friction material 54 is disposed on the first side 36 of the first core plate 28, and a second friction material 56 is disposed on the second side 38 of the first core plate 28. Moreover, a third friction material 58 is disposed on the first side 50 of the second core plate 46 and the fourth friction material 60 is disposed on the second side 52 of the second core plate 46.

Figure 9:
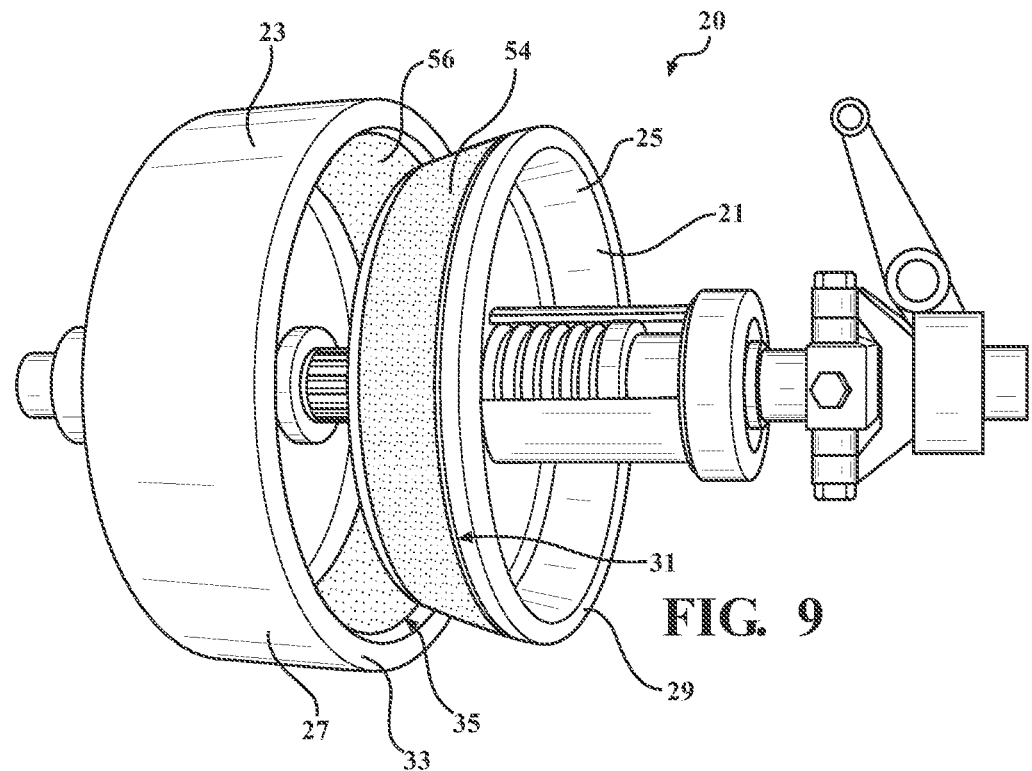
FIG. 9 is a side perspective view of a clutch system according to another embodiment in a disengaged position.
Figure 10:
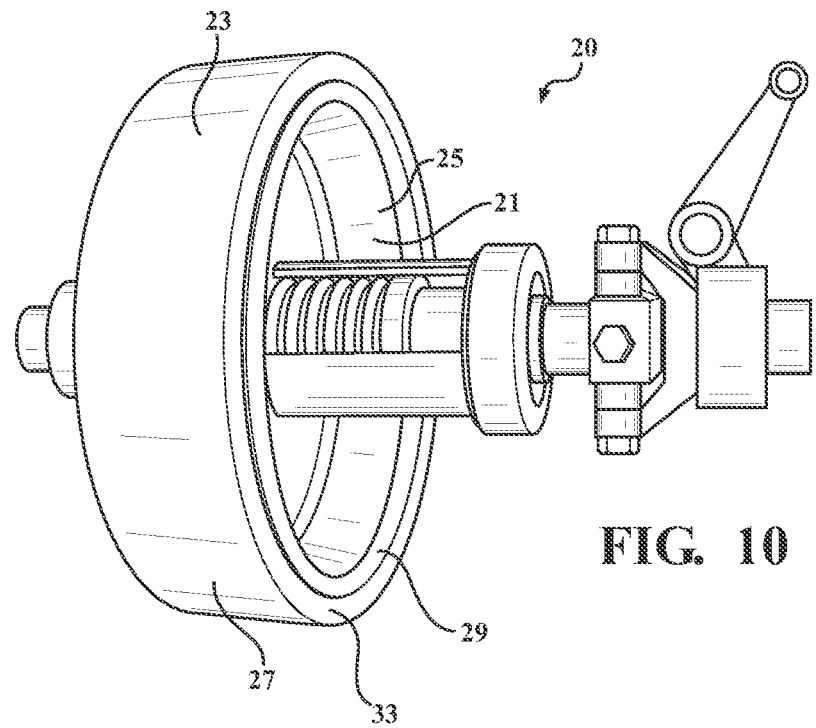
FIG. 10 is a side perspective view of the clutch system of FIG. 9 in an engaged position.

In one example, illustrated in FIGS. 9 and 10 the first clutch element 29 is the first cone 25 and the first surface 31 is an outer conical surface and the first friction material 54 is disposed on the outer conical surface. In other words, the first cone 25 is a male cone element having an aperture therethrough to accept the shaft 26. The second clutch element 33 is the second cone 27 and the second surface 35 is an inner conical surface such that the second friction material 56 is disposed on the inner conical surface. In other words, the second cone 27 is a female cone element also having an aperture to accept the shaft 26 and is configured to be engaged with the first cone 25. The first cone 25 and the second cone 27 may be the similar to the first and second core plates 28, 46 described herein with respect to material, function, bores, etc.

The first friction material 54, the second friction material 56, the third friction material 58, and the fourth friction material 60 may be the same or different, including the same or different in chemical composition and/or in physical form. In one example, at least one of the first friction material 54, the second friction material 56, the third friction material 58, and the fourth friction material 60 is free of steel. Preferably, all of the friction materials 54, 56, 58, and 60 are free of steel. In other words, it is preferred that none of the first friction material 54, the second friction material 56, the third friction material 58, and the fourth friction material 60 are separator plates and/or comprised of steel. In another example, at least one of the first friction material 54, the second friction material 56, the third friction material 58, and the fourth friction material 60 is comprised of a paper material. Although not required, with many paper materials, the fibers included therein comprise cotton and have a fiber length of from about 1 to about 9 mm. These fibers are described additionally below. In this paper material example, preferably all of the friction materials 54, 56, 58, and 60 are comprised of the paper material. In other words, for this example, it is also preferred that none of the first friction material 54, the second friction material 56, the third friction material 58, and the fourth friction material 60 are separator plates and/or comprised of steel. As a result of the arrangements described in this paragraph, a friction-to-friction interface is achieved between the first and second clutch plates 22, 24.

The friction material is a component of the clutch system 20 and any description for the friction material included herein is applicable to any one or more of the first friction material 54, the second friction material 56, the third friction material 58, and the fourth friction material 60. In certain embodiments, the friction material may comprise one or more plys or layers. In other words, in this instance, the friction material does not include two or more distinct plys or layers. In such instances, the friction material is also referred to as a single body.

In other embodiments, the friction material comprises two or more plys or layers, i.e., multiple plys or multiple layers. For example, the friction material may comprise two layers as would be present in a two-ply structure. Non-limiting, exemplary multi-layer friction materials are described in: U.S. Pat. Nos. 6,875,711; 10,436,272; and U.S. Publication No. 2019/0003544, the entire contents of which are included herein for reference.

Figure 5:
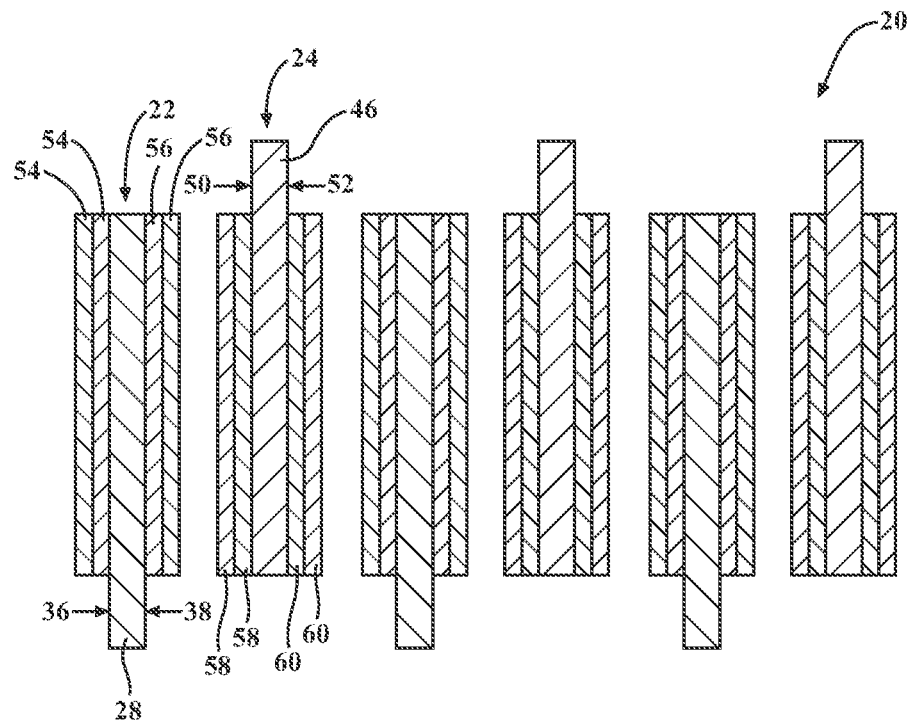
FIG. 5 is a further simplified cross-sectional view of a clutch system according to the present invention including a plurality of clutch plates having a double-layer friction material disposed thereon.
Figure 6:
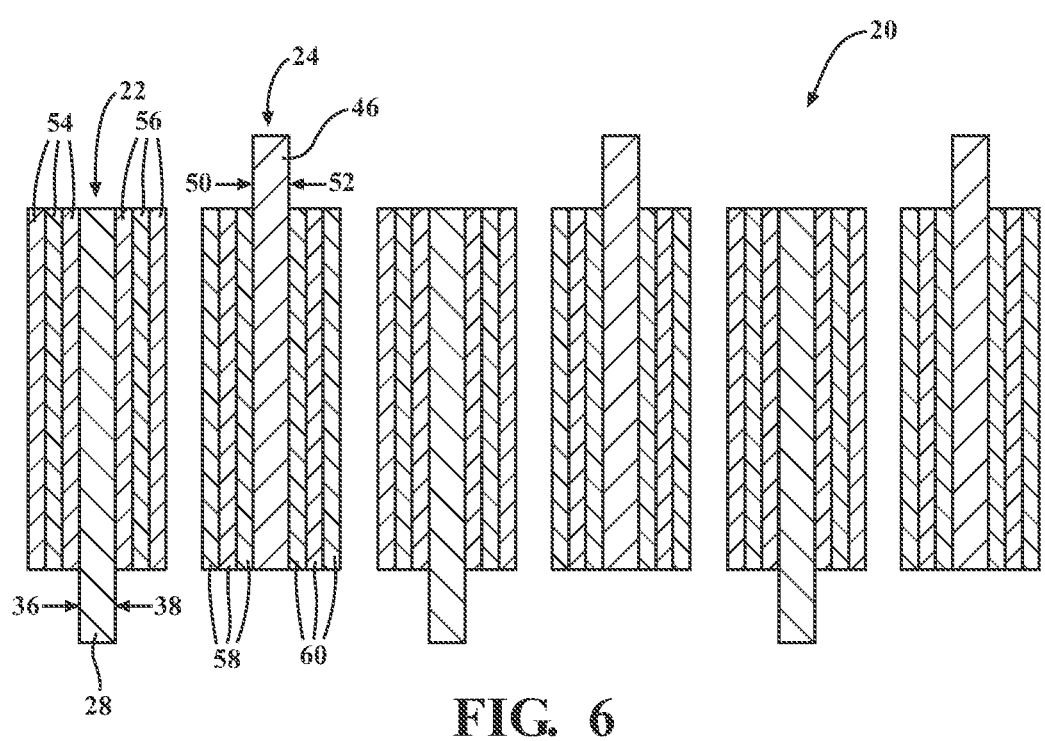
FIG. 6 is a further simplified cross-sectional view of a clutch system according to the present invention including a plurality of clutch plates having a triple-layer friction material disposed thereon.

In one example, illustrated in FIG. 5, at least one of the first friction material 54, the second friction material 56, the third friction material 58, and the fourth friction material 60 is a double-layer friction material. However, it is also contemplated that at least one of the first friction material 54, the second friction material 56, the third friction material 58, and the fourth friction material 60 is a single-layer friction material as shown in FIGS. 2A and 2B, or a triple-layer friction material as show in FIG. 6. It is to be appreciated that double-layer friction materials can be used in combination with triple-layer friction materials as necessary.

As noted above, the first friction material 54, the second friction material 56, the third friction material 58, and the fourth friction material 60 can be the same or different. Although not required, in certain embodiments, the first friction material 54, the second friction material 56, the third friction material 58, and the fourth friction material 60 each independently comprise a friction-generating layer and a base layer. The friction-generating layer presents a friction-generating surface and comprises friction-particles comprising diatomaceous earth particle and/or cashew nut particles. The base layer is adjacent the friction-generating layer and presents a bonding surface facing opposite, and generally parallel to, the friction-generating surface of the friction-generating layer. The bonding surface of the base layer is adhered to the core plate 28, 46, first cone 25, and second cone 27. The base layer comprises fibers and a filler. As described additionally below, the fibers in the base layer comprise aramid fibers, carbon fibers, and/or cellulose fibers; and the filler comprises carbon particles and/or diatomaceous earth particles. Additional description and options for the fibers and fillers are included below. Furthermore, the friction material is typically porous and includes a resin present in the friction-generating layer and the base layer.

The friction material includes the base layer. As indicated above, it is to be appreciated that, in some embodiments, the friction material is a single layer material and thus includes only the base layer, and no additional layers (e.g. friction generating layers) are included. The base layer may be alternatively described as a core layer, as a primary layer, or as a porous layer. In some embodiments, the base layer has a thickness of from 0.2 mm to 3.7 mm, from 0.3 mm to 3 mm, from 0.3 mm to 2 mm, from 0.3 mm to 1 mm, from 0.3 mm to 0.9 mm, from 0.4 mm to 0.8 mm, from 0.5 mm to 0.7 mm, from 0.6 mm to 0.7 mm, or from 0.2 mm to 0.35 mm. Alternatively, the thickness of the base layer is less than 3.75 mm, less than 3 mm, less than 2 mm, less than 1 mm, less than 0.9 mm, less than 0.8 mm, less than 0.7 mm, less than 0.6 mm, less than 0.5 mm, or less than 0.4 mm, but greater than 0.1 mm. In additional non-limiting embodiments, all thickness values and ranges of values within and including the aforementioned range endpoints are hereby expressly contemplated. This thickness may refer to a thickness prior to, or after, resin cure.

The base layer includes the fibers. The fibers may be alternatively described as a plurality of fibers. One or more different types of fibers may be included in the base layer. The fibers may be chosen from aramid fibers, carbon fibers, cellulose fibers, acrylic fibers, polyvinyl alcohol fibers, glass fibers, mineral fibers, and combinations thereof. In various embodiments, the fiber includes one or combinations of the aforementioned fiber types. All weight ranges and ratios of various combinations of the aforementioned fibers are hereby expressly contemplated in various non-limiting embodiments.

The fibers may include aramid, e.g. AB homopolymers, AABB polymers, etc. In other embodiments, the fibers consist of or consist essentially of aramid. Various non-limiting examples of aramids include tradenames such as Kevlar®, Twaron®, Nomex®, New Star® and Teijinconex®. One or more types of aramids may be used. In one embodiment, the aramid is poly-paraphenylene terephthalamide. In another embodiment, the aramid is two or more types of aramid, e.g. a first poly-paraphenylene terephthalamide and a second poly-paraphenylene terephthalamide that is different from the first.

In some embodiments, the fibers include cellulose, e.g. from wood, cotton, etc. In other embodiments, the fibers consist essentially of or consist of cellulose. The cellulose fibers may be chosen from abacá fiber, bagasse fiber, bamboo fiber, coir fiber, cotton fiber, fique fiber, flax fiber, linen fiber, hemp fiber, jute fiber, kapok fiber, kenaf fiber, piña fiber, pine fiber, raffia fiber, ramie fiber, rattan fiber, sisal fiber, wood fiber, and combinations thereof. In some specific embodiments, cellulose fibers that are derived from wood are used, such as birch fibers and/or eucalyptus fibers. In other embodiments, cellulose fibers such as cotton fibers are used. If used, cotton fibers typically have fibrillated strands attached to a main fiber core and aid in preventing delamination of the friction material during use.

In still other embodiments, the fibers include acrylic. In other embodiments, the fibers consist of or consist essentially of acrylic. Acrylic fibers are typically formed from one or more synthetic acrylic polymers such as those formed from at least 85% by weight acrylonitrile monomers.

In still other embodiments, the fibers include carbon. In other embodiments, the fibers consist of or consist essentially of carbon.

In various embodiments, the fibers have diameters from 1 µm to 500 µm and lengths from 0.1 mm to 20 mm. In additional non-limiting embodiments, all values and ranges of values of diameter and length within and including the aforementioned range endpoints are hereby expressly contemplated.

The fibers may be woven, non-woven, sintered or any other suitable construction.

In various embodiments, the fibers have a Canadian Standard Freeness (T 227 om) ("CSF") of greater than 200. In some embodiments, less fibrillated fibers are utilized which have a CSF of 250 to 550. In other embodiments, the fibers have a CSF of 550 to 750 or greater than 750. In additional non-limiting embodiments, all values and ranges of values of CSF within and including the aforementioned range endpoints are hereby expressly contemplated.

The terminology "CSF" describes that the degree of fibrillation of fibers may be described as the measurement of freeness of the fibers. The CSF test is an empirical procedure which gives an arbitrary measure of the rate at which a suspension of three grams of fiber in one liter of water may be drained. Therefore, less fibrillated fibers have higher freeness or higher rate of drainage of fluid from the friction material than other fibers. Notably, CSF values can be converted to Schopper Riegler values. The CSF can be an average value representing the CSF of all fibers. As such, it is to be appreciated that the CSF of any one particular fiber may fall outside the ranges provided above, yet the average value will fall within these ranges.

The base layer also includes the filler. The filler is not limited and may be any known in the art. For example, the filler may be a reinforcing filler or a non-reinforcing filler. The filler may be chosen from silica, diatomaceous earth, graphite, carbon, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. In various embodiments, the filler is diatomaceous earth. In various embodiments, the filler includes one or more combinations of the aforementioned filler types. All weight ranges and ratios of the various combinations of the aforementioned filler types are hereby expressly contemplated in various non-limiting embodiments.

The filler may have a particle size from 0.5 to 80 microns, or from 0.5 to 20 microns. In additional non-limiting embodiments, all values and ranges of values of particle size within and including the aforementioned range endpoints are hereby expressly contemplated.

The base layer may further include additives known in the art.

The friction material may also include the friction-generating layer. The friction-generating layer is also commonly referred to as a "deposit" or "deposit layer". The friction-generating layer may be disposed in the friction material in a graduated pattern measured in a direction from the friction-generating surface into the base layer (towards the bonding surface) wherein a concentration of the components of the friction-generating layer is greatest at the friction-generating surface.

In many embodiments, the friction-generating layer has a thickness of from 10 µm to 600 µm, from 12 µm to 450 µm, from 12 µm to 300 µm, from 12 µm to 150 µm, or from 14 µm to 100 µm. Alternatively, the thickness of the friction-generating layer is less than 150 µm, less than 125 µm, less than 100 µm, or less than 75 µm, but greater than 10 µm. In additional non-limiting embodiments, all values and ranges of values of thickness within and including the aforementioned range endpoints are hereby expressly contemplated. The thickness may refer to a thickness of the friction-generating layer prior to, or after, resin cure.

The friction-generating layer may include the friction-adjusting particles. The friction-adjusting particles may include one or more different types of particles. The friction-adjusting particles provide a high coefficient of friction to the friction material. The type or types of the friction-adjusting particles utilized may vary depending on the friction characteristics sought.

In various embodiments, the friction-adjusting particles may be chosen from any of the one or more filler particle types (the filler) described above. Alternatively, the filler above may be chosen from any one or more of the friction-adjusting particle types (friction-adjusting particles) described below.

In various embodiments, the friction-adjusting particles are chosen from silica particles, carbon particles, graphite particles, alumina particles, magnesia particles, calcium oxide particles, titania particles, ceria particles, zirconia particles, cordierite particles, mullite particles, sillimanite particles, spodumene particles, petalite particles, zircon particles, silicon carbide particles, titanium carbide particles, boron carbide particles, hafnium carbide particles, silicon nitride particles, titanium nitride particles, titanium boride particles, cashew nut particles, rubber particles, and combinations thereof. In various embodiments, the friction-adjusting particles include one or more combinations of the aforementioned particle types. All weight ranges and ratios of the various combinations of the aforementioned particle types are hereby expressly contemplated in various non-limiting embodiments.

In some embodiments, the friction-adjusting particles include at least one particle type chosen from cashew nut particles, silica particles, and diatomaceous earth particles. In other embodiments, the friction-adjusting particles consist essentially of or consist of various combinations of cashew nut particles, silica particles, and diatomaceous earth particles.

In some embodiments, the friction-adjusting particles include cashew nut particles. In yet other particular embodiments, the friction-adjusting particles consist essentially of or consist of cashew nut particles. Of course, in some such embodiments, the friction-generating layer consists essentially of or consists of cashew nut particles. Those of skill in the art understand cashew nut particles to be particles formed from cashew nut shell oil. Cashew nut shell oil is sometimes also referred to as cashew nut shell liquid (CNSL) and its derivatives.

In some embodiments, the friction-adjusting particles include diatomaceous earth particles. Of course, in other embodiments, the friction-adjusting particles consist essentially of or consist of diatomaceous earth particles. In some such embodiments, the friction-generating layer therefore consists essentially of or consists of diatomaceous earth particles. Diatomaceous earth is a mineral comprising silica. Diatomaceous earth is an inexpensive, abrasive material that exhibits a relatively high coefficient of friction. CELITE® and CELATOM® are two trade names of diatomaceous earth that may be used.

In some embodiments, the friction-adjusting particles include a combination of cashew nut particles and diatomaceous earth particles. Of course, in other embodiments, the friction-adjusting particles consist essentially of or consist of a combination of cashew nut particles and diatomaceous earth particles. In some such embodiments, the friction-generating layer consists essentially of or consists of a combination of cashew nut particles and diatomaceous earth particles.

In various embodiments, the friction-adjusting particles include elastomeric particles. Elastomeric particles exhibit elasticity and other rubber-like properties. Such elastomeric particles may be at least one particle type chosen from cashew nut particles and rubber particles. In some embodiments, rubber particles including silicone rubber, styrene butadiene rubber, butyl rubber, and halogenated rubbers, such as chlorobutyl rubber, bromobutyl rubber, polychloroprene rubber, and nitrile rubber, are used. In other embodiments, rubber particles consisting essentially of or consisting of silicone rubber, styrene butadiene rubber, butyl rubber, and halogenated rubbers such as chlorobutyl rubber, bromobutyl rubber, polychloroprene rubber, and nitrile rubber are used.

In some particular embodiments, the elastomeric particles include silicone rubber particles. In other particular embodiments, the elastomeric particles consist essentially of or consist of silicone rubber particles.

In some particular embodiments the elastomeric particles include nitrile rubber particles. In other particular embodiments, the elastomeric particles consist essentially of or consist of nitrile rubber particles.

In various embodiments, the friction-adjusting particles have an average diameter of from 100 nm to 80 μm, from 500 nm to 30 μm, or from 800 nm to 20 μm. In additional non-limiting embodiments, all values and ranges of values of average diameter within and including the aforementioned range endpoints are hereby expressly contemplated.

The friction-generating layer may further include friction-adjusting fibers. The friction-adjusting fibers below may be chosen from any of the fiber types (the fiber) described above.

In some embodiments, the friction-generating layer includes friction-adjusting particles but does not include the friction-adjusting fibers. In some such embodiments, the friction-generating layer consists essentially of or consists of friction-adjusting particles.

In other embodiments, the friction-generating layer includes both friction-adjusting particles and friction-adjusting fibers. For example, in some particular embodiments, the friction-generating layer includes cellulose fibers, diatomaceous earth particles, and, optionally, elastomeric particles.

The friction-generating layer may further include additives known in the art.

In various embodiments, the components (e.g. the friction-adjusting particles, friction-adjusting fibers, and/or any additives) of the friction-generating layer are utilized in an amount of from 0.5 to 100 lbs. per 3000 ft$^2$ (0.2 to 45.4 kg per 278.71 m$^2$) of a surface of the base layer, from 3 to 80 lbs. per 3000 f$^2$ (1.4 kg to 36.3 kg per 278.71 m$^2$) of the surface of the base layer, from 3 to 60 lbs. per 3000 f$^2$ (1.4 kg to 27.2 kg per 278.71 m$^2$) of the surface of the base layer, from 3 to 40 lbs. per 3000 f$^2$ (1.4 kg to 18.1 kg per 278.71 m$^2$) of the surface of the base layer, from 3 to 20 lbs. per 3000 ft$^2$ (1.4 kg to 9.1 kg per 278.71 m$^2$) of the surface of the base layer, from 3 to 12 lbs. per 3000 ft$^2$ (1.4 kg to 5.4 kg per 278.71 m$^2$) of the surface of the base layer, or from 3 to 9 lbs. per 3000 ft$^2$ (1.4 kg to 4.1 kg per 278.71 m$^2$) of the surface of the base layer. In additional non-limiting embodiments, all values and ranges of values of amounts within and including the aforementioned range endpoints are hereby expressly contemplated. The amounts described immediately above are in units of lbs. per 3000 ft$^2$, which are units customarily used in the paper making industry as a measurement of weight based on a surface area. Above, the units express the weight of the friction-generating layer for every 3000 ft$^2$ of the surface of the base layer.

As indicated above, the friction material may also include one or more additional layers. The additional layers can include any combination of the fibers and fillers described above.

A resin is present within the friction material. The resin may be dispersed homogeneously or heterogeneously within the friction material. In some embodiments, the resin is present in one of the layers. Typically, the resin is present in all of the one or more layers.

The resin may be curable. Alternatively, the resin may be of the type that does not cure. In various embodiments, depending on the stage of formation of the friction material, the resin may be uncured, partially cured, or entirely cured.

In some embodiments, the resin may be any thermosetting resin suitable for providing structural strength to the friction material. Phenolic resins and phenolic-based resins may be utilized. A phenolic resin is a class of thermosetting resins that is produced by the condensation of an aromatic alcohol, typically a phenol, and an aldehyde, typically a formaldehyde. A phenolic-based resin is a thermosetting resin blend that typically includes at least 50 wt. % of a phenolic resin based on the total weight of all resins and excluding any solvents or processing acids. It is to be understood that various phenolic-based resins may include modifying ingredients, such as epoxy, butadiene, silicone, tung oil, benzene, cashew nut oil and the like. In some embodiments, a silicone modified phenolic resin which includes 5 to 80 weight percent of a silicone resin with the remainder weight percent being attributed to the phenolic resin or combination of the phenolic and other different resins is used. In other embodiments, an epoxy modified phenolic resin which includes 5 to 80 weight percent weight percent of an epoxy resin with the remainder weight percent being attributed to the phenolic resin or combination of the phenolic and other different resins is used.

In some embodiments, the resin may include 5 to 100 or 5 to 80, weight percent of a silicone resin based on the total weight of all resins and excluding any solvents or processing acids. Silicone resins that may be used may include thermal curing silicones and elastomeric silicone. Various silicone resins may also be used such as those that include D, T, M, and Q units (e.g. DT resins, MQ resins, MDT resins, MTQ resins, QDT resins . . . ).

In various embodiments, the resin is present in an amount of from 20 to 90, 20 to 80, or 25 to 60, weight percent based on a total weight of all non-resin components in the friction material 10. For example, the resin may be present in an amount of from 25 to 75, 25 to 70, 30 to 75, 30 to 70, or 30 to 55, or 35 to 65, weight percent based on a total weight of all non-resin components in the friction material. This value may be alternatively described as resin "pick up." In additional non-limiting embodiments, all values and ranges of values of resin amounts within and including the aforementioned range endpoints are hereby expressly contemplated.

Once cured, the cured resin confers strength and rigidity to the friction material and adheres the components of the layer(s) to one another while maintaining a desired porosity for proper lubricant flow and retention and also bonds the friction material to the substrate, e.g. the core plate 28, 46, as described below.

The friction material includes plurality of pores. Each of the pores has a pore size.

The pores may be distributed homogeneously or heterogeneously throughout the friction material. For example, at least one of the base layers, the friction-generating layer, and any additional layers may include the pores (be porous). In some examples, each layer has a different porosity, average pore size, and/or median pore size. In other examples, each layer has about the same porosity average pore size, and/or median pore size.

The pore size may be determined using ASTM D4404-10. In various embodiments, the median pore size in the friction material is from 0.5 to 50, 1 to 50, 2 to 50, 2 to 45, 2 to 30, 2 to 15, or 3 to 10, µm as determined using ASTM D4404-10. In additional non-limiting embodiments, all values and ranges of values of median pore size within and including the aforementioned range endpoints are hereby expressly contemplated.

In other embodiments, the friction material has a porosity of from 25% to 85% as determined using ASTM D4404-10. The porosity of the friction material may be described as a percentage of the friction material that is open to air. In various embodiments, the friction material 10 has a porosity of from 30 to 80, or 40 to 75, % as determined using ASTM test method D4404-10. In additional non-limiting embodiments, all values and ranges of values of porosity within and including the aforementioned range endpoints are hereby expressly contemplated.

In still other embodiments, the friction material has a compression of from 2 to 30, from 4 to 15, or from 6 to 8, %, at 2 MPa. Compression is a material property of the friction material that may be measured when the friction material is disposed on a substrate (i.e., measured when the friction material is disposed on a core plate as part of a friction plate) or when the friction material is not disposed on a substrate. Typically, compression is a measurement of a distance (e.g. mm) that the friction material 10 is compressed under a certain load. For example, a thickness of the friction material 10 before a load is applied is measured. Then, the load is applied to the friction material 10. After the load is applied for a designated period of time, the new thickness of the friction material 10 is measured. Notably, this new thickness of the friction material 10 is measured as the friction material 10 is still under the load. The compression is typically related to elasticity, as would be understood by those of skill in the art. The more elastic the friction material is, the more return that will be observed after compression. This typically leads to less lining loss and formation of less hot spots, both of which are desirable during use. In additional non-limiting embodiments, all values and ranges of compression values within and including the aforementioned range endpoints are hereby expressly contemplated.

The initial thickness of the friction material is typically from 0.3 to 4, from 0.4 to 3, from 0.4 to 2, from 0.4 to 1.6, from 0.4 to 1.5, from 0.5 to 1.4, from 0.6 to 1.3, from 0.7 to 1.2, from 0.8 to 1.1, or from 0.9 to 1, mm. This thickness refers to a thickness prior to bonding to the substrate (e.g. core plate 28, 46) and may be referred to as caliper thickness. This thickness can refer to the thickness of the friction material with uncured resin dispersed throughout, or the thickness of the raw paper without resin. In additional non-limiting embodiments, all values and ranges of values of thickness within and including the aforementioned range endpoints are hereby expressly contemplated.

After bonding to the substrate and resin cure, a total thickness of the friction material is typically from 0.3 to 3.75, from 0.4 to 3, from 0.4 to 2, from 0.4 to 1.6, from 0.4 to 1.5, from 0.5 to 1.4, from 0.6 to 1.3, from 0.7 to 1.2, from 0.8 to 1.1, or from 0.9 to 1, mm. This thickness is typically the thickness of the fibers/base including the deposit and resin and is measured after bonding to the substrate. In additional non-limiting embodiments, all values and ranges of values of total thickness within and including the aforementioned range endpoints are hereby expressly contemplated.

In various embodiments, the friction material is bonded to the substrate, which is typically the core plate, the first cone, and the second cone. When bonded to the substrate, the bonding surface achieves bonded attachment to the substrate with or without the aid of an adhesive or some other suitable bonding technique.

In one example, the friction material includes a friction-generating layer presenting a friction-generating surface. The friction-generating material includes friction-adjusting particles selected from carbon particles, diatomaceous earth particles, cashew nut particles, and combinations thereof. The friction material may also include a base layer adjacent to the friction-generating layer and presenting a bonding surface facing opposite the friction-generating surface of the friction generating layer. The base layer includes fibers including aramid fibers, carbon fibers, and/or cellulose fibers along with filler comprising carbon particles and/or diatomaceous earth particles. Additionally, a resin is present in the friction generating layer, the core layer, and the base layer.

Figure 7:
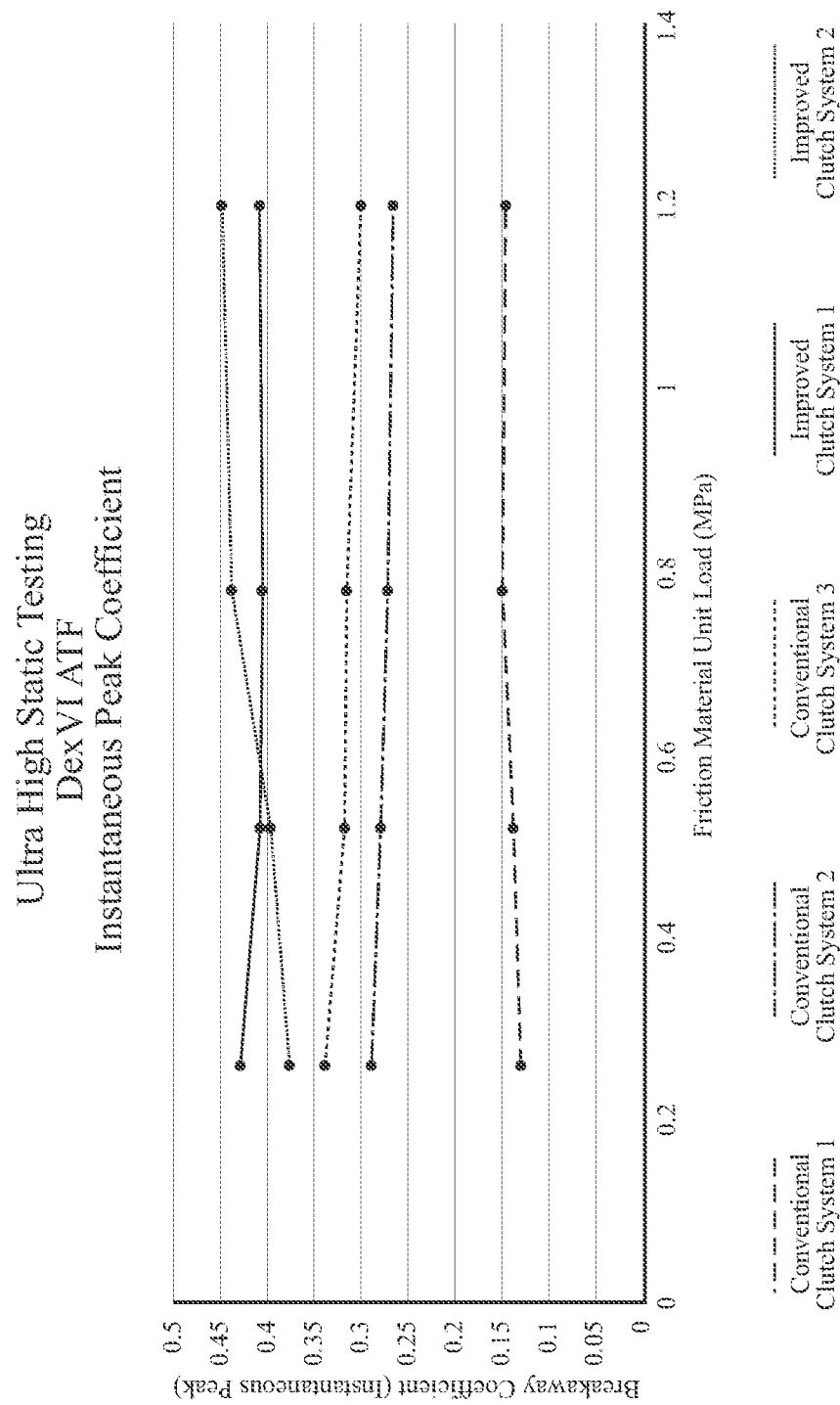
FIG. 7 is a graphical representation of Instantaneous Peak Coefficient plotted with respect to Friction Material Load.
Figure 8:
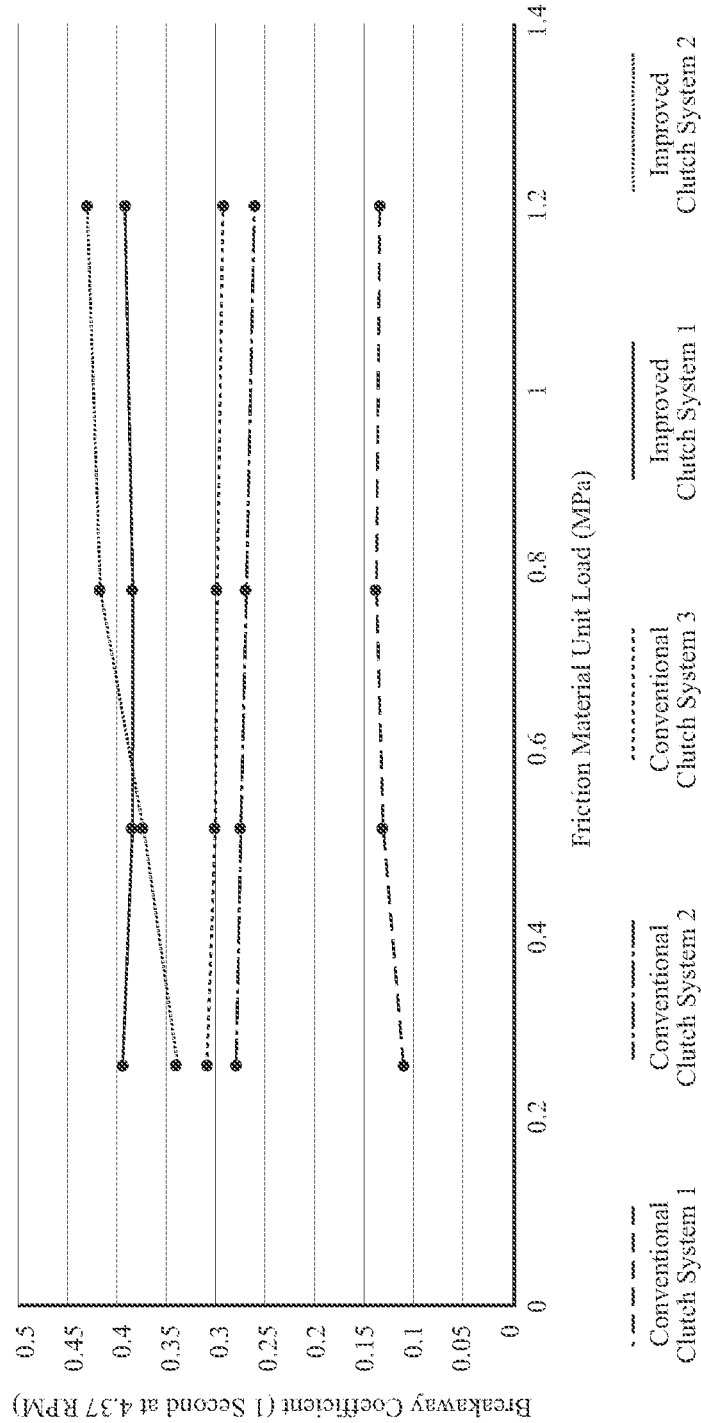
FIG. 8 is a graphical representation of Breakaway Coefficient plotted with respect to Friction Material Load.

During operation of the vehicle power generator 12, the first clutch plate 22 and the second clutch plate 24 move between a disengaged position where the first clutch plate 22 and the second clutch plate 24 are disengaged from one another, and an engaged position where the first clutch plate 22 and the second clutch plate 24 are engaged with one another. Traditional clutch systems 100 (see FIG. 1) include steel separator plates which are positioned between the clutch plates to provide a heat sink for energy created during engagement. However, importantly, the clutch system 20 as described herein is free of steel separator plates. More specifically, when the first clutch plate 22 and the second clutch plate 24 are in the engaged position, the second friction material 56 disposed on the first core plate 28 is configured to be engaged with the third friction material 58 disposed on the second core plate 46. By directly engaging the second friction material 56 and the third friction material 58, a friction-to-friction interface is established. Furthermore, by directly engaging the second friction material 56 and the third friction material 58, the Breakaway Coefficient at "Instantaneous Peak" (FIG. 7) and at "1 Second" (FIG. 8) are increased over traditional clutch assemblies having a steel separator plate. More specifically, FIGS. 7 and 8 graphically illustrate the increased Breakaway Coefficient and Instantaneous Peak of a first and second improved clutch system 20 (either Improved Clutch System 1 or 2) over Conventional Clutch systems 1, 2, and 3. Eliminating separator plates leads to weight reductions and reductions in axial lengths of both the vehicle transmission system 10 and the clutch system 20 which leads to increased overall fuel efficiency and lower vehicle emissions. Moreover, having the second friction material 56 and the third friction material 58 directly engage one another during operation leads to additional improved vehicle performance including an increased Breakaway Coefficient across various loads, as best illustrated in FIGS. 7 and 8.

Similarly, as best illustrated in FIGS. 9 and 10, the first cone 25 and the second cone 27 move between a disengaged position where the first cone 25 and the second cone 27 are disengaged from one another, and an engaged position where the first cone 25 and the second cone 27 are engaged with one another, ie., the first friction material 54 of the first cone 25 engages the second friction material 56 of the second cone 27. Traditional cone clutch systems engage a first friction material 54 of the first cone 25 with a steel surface of the second cone 27 to provide a heat sink for energy created during engagement. However, the clutch system 20 as described herein engages the first friction material 54 of the first cone 25 with the second friction material 56 of the second cone 27. By directly engaging the first friction material 54 and the second friction material 56, a friction-to-friction interface is established, which, as described above, provides weight and length reductions along with vehicle performance enhancements.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure. Furthermore, one or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A clutch system operably coupled to a vehicle power generator, said clutch system comprising:
    a first clutch member for transmitting torque from the vehicle power generator, said first clutch member comprising:
        a first clutch element having a first surface, wherein said first surface faces a first direction, and
        a first friction material disposed on said first surface; and
    a second clutch member for transmitting torque from the vehicle power generator and configured to engage said first clutch member, said second clutch member comprising:
        a second clutch element having a second surface, wherein said second surface faces a second direction opposite said first direction, and
        a second friction material disposed on said second surface;
    wherein said first friction material and said second friction material may be the same or different;
    wherein said first friction material is configured to be directly engaged with said second friction material during operation of the vehicle power generator; and
    wherein said first friction material and said second friction material each independently have a thickness that is greater than 0.1 mm.

2. The clutch system of claim 1, wherein at least one of said first clutch element and said second clutch element is comprised of steel.

3. The clutch system of claim 1, wherein at least one of said first friction material and said second friction material is free of steel.

4. The clutch system of claim 1, wherein at least one of said first friction material and said second friction material is comprised of a paper material.

5. The clutch system of claim 1, wherein at least one of said first friction material and said second friction material is a double-layer friction material.

6. The clutch system of claim 1, wherein said first clutch element is a first cone and said first surface is an outer conical surface such that said first friction material is disposed on said outer conical surface.

7. The clutch system of claim 6, wherein said second clutch element is a second cone and said second surface is an inner conical surface such that said second friction material is disposed on said inner conical surface.

8. The clutch system of claim 1, wherein a thermosetting resin is present in said first friction material or said second friction material.

9. The clutch system of claim 8, wherein said thermosetting resin is present in said first friction material and said second friction material.

10. A vehicle transmission system operably coupled to a vehicle power generator, said vehicle transmission system comprising:
a vehicle transmission coupled to the vehicle power generator; and
a clutch system operably coupled to said vehicle transmission, said clutch system comprising:
a first clutch member for transmitting torque from the vehicle power generator, said first clutch member comprising:
a first clutch element having a first surface, wherein said first surface faces a first direction, and
a first friction material disposed on said first surface, and
a second clutch member for transmitting torque from the vehicle power generator and configured to engage said first clutch member, said second clutch member comprising:
a second clutch element having a second surface, wherein said second surface faces a second direction opposite said first direction, and
a second friction material disposed on said second surface,
wherein said first friction material and said second friction material may be the same or different;
wherein said first friction material is configured to be directly engaged with said second friction material during operation of the vehicle power generator; and
wherein said first friction material and said second friction material each independently have a thickness that is greater than 0.1 mm.

11. The vehicle transmission system of claim 10, wherein at least one of said first clutch element and said second clutch element is comprised of steel.

12. The vehicle transmission system of claim 10, wherein at least one of said first friction material and said second friction material is free of steel.

13. The vehicle transmission system of claim 10, wherein at least one of said first friction material and said second friction material is a single-layer friction material.

14. The vehicle transmission system of claim 10, wherein at least one of said first friction material and said second friction material is a triple-layer friction material.

15. The vehicle transmission system of claim 10, wherein said clutch system is a wet clutch system.

16. The vehicle transmission system of claim 10, wherein said clutch system is free of steel separator plates.

17. The vehicle transmission system of claim 10, wherein said first clutch element is a first cone and said first surface is an outer conical surface such that said first friction material is disposed on said outer conical surface.

18. The vehicle transmission system of claim 10, wherein said second clutch element is a second cone and said second surface is an inner conical surface such that said second friction material is disposed on said inner conical surface.

19. A clutch system operably coupled to a vehicle engine, said clutch system comprising:
a first clutch plate for transmitting torque from the vehicle engine, said first clutch plate comprising:
a first core plate,
a first friction material disposed on a first side of said first core plate, and
a second friction material disposed on a second side of said first core plate opposite said first side of said first core plate; and
a second clutch plate for transmitting torque from the vehicle engine and configured to directly engage said first clutch plate, said second clutch plate comprising:
a second core plate,
a third friction material disposed on a first side of said second core plate,
wherein said first side of said second core plate faces a first direction and wherein said second side of said first core place faces a second direction opposite said first direction, and
a fourth friction material disposed on a second side of said second core plate opposite said first side of said second core plate;
wherein said first friction material, said second friction material, said third friction material, and said fourth friction material may be the same or different;
wherein said second friction material is configured to be directly engaged with said third friction material during operation of the vehicle engine; and
wherein said second friction material and said third friction material each independently have a thickness that is greater than 0.1 mm.

20. The clutch system of claim 19, wherein at least one of said first core plate and said second core plate is comprised of steel.

21. The clutch system of claim 19, wherein at least one of said first friction material, said second friction material, said third friction material and said fourth friction material is free of steel.

22. The clutch system of claim 19, wherein at least one of said first friction material, said second friction material, said third friction material and said fourth friction material is comprised of a paper material.

23. The clutch system of claim 19, wherein at least one of said first friction material, said second friction material, said third friction material and said fourth friction material is a single-layer friction material.

24. The clutch system of claim 19, wherein at least one of said first friction material, said second friction material, said third friction material and said fourth friction material is a double-layer friction material.

25. The clutch system of claim 19, wherein said clutch system is free of steel separator plates.

26. The clutch system of claim 19, wherein a thermosetting resin is present in said first friction material or said second friction material.

27. The clutch system of claim 9, wherein said thermosetting resin in said first and second friction materials is a phenolic-based resin including at least 50 wt. % of a phenolic resin based on the total weight of all resins and excluding solvents and processing acid.

\* \* \* \* \*